H. SMITH.
CONVERTIBLE AUTOMOBILE BODY.
APPLICATION FILED FEB. 2, 1916.
1,251,433.
Patented Dec. 25, 1917.
3 SHEETS—SHEET 1.
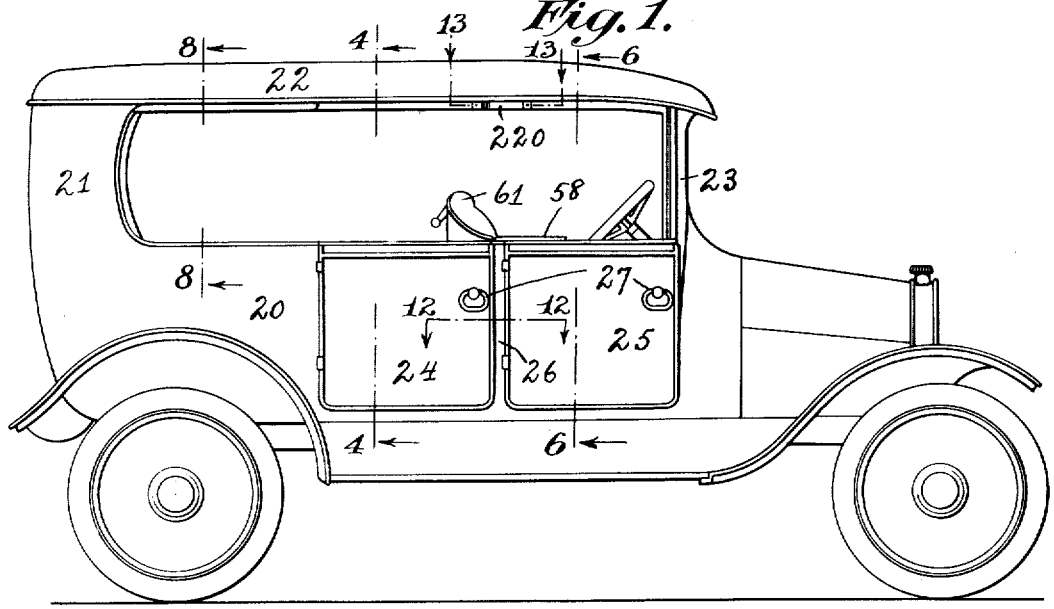
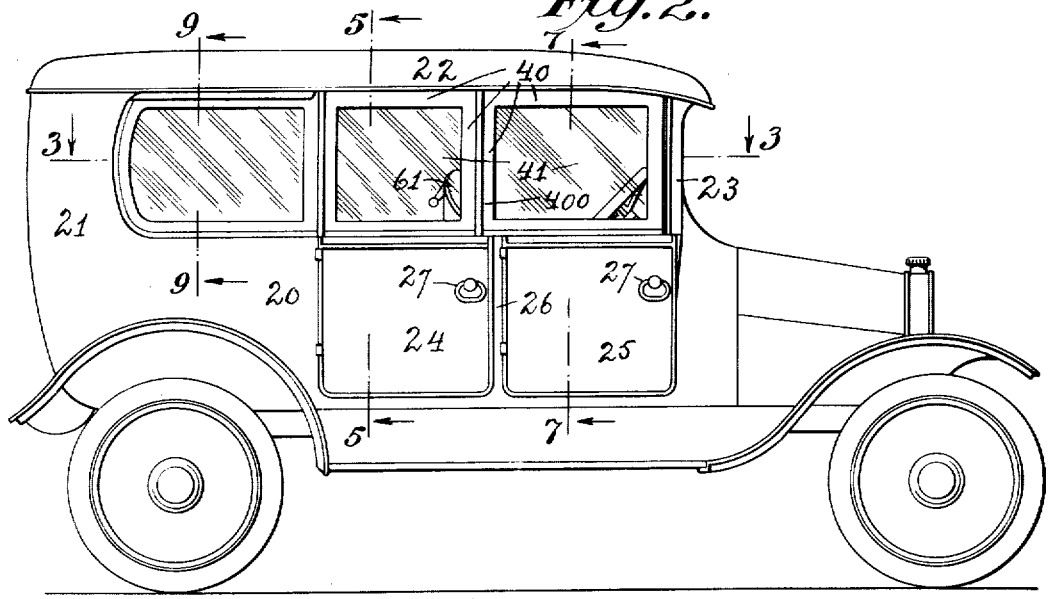
Hinsdale Smith, Inventor:
by William R Baird
his Atty.

H. SMITH.
CONVERTIBLE AUTOMOBILE BODY.
APPLICATION FILED FEB. 2, 1916.
1,251,433.
Patented Dec. 25, 1917.
3 SHEETS—SHEET 2.
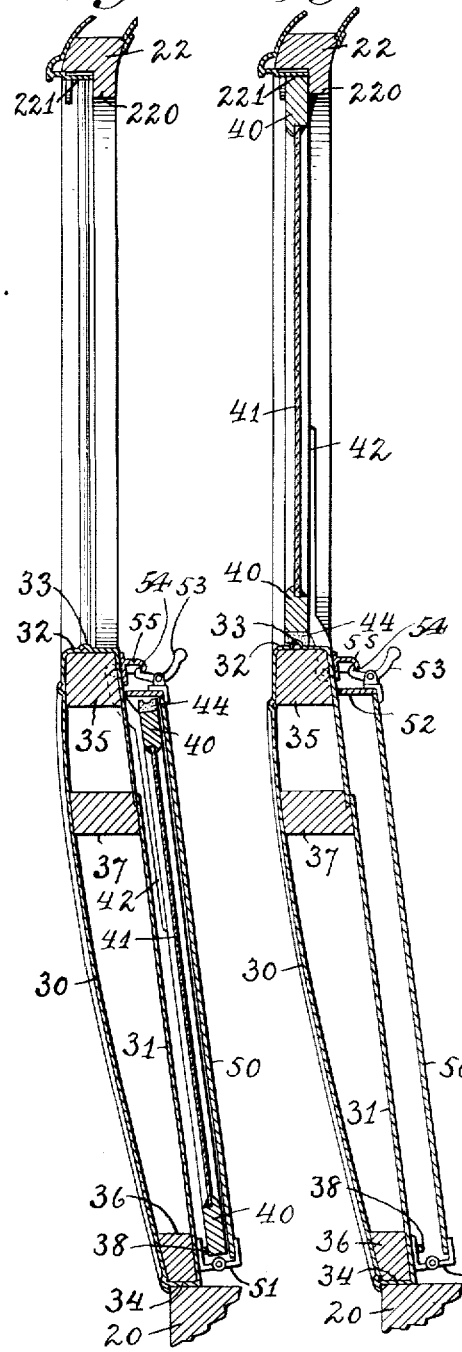
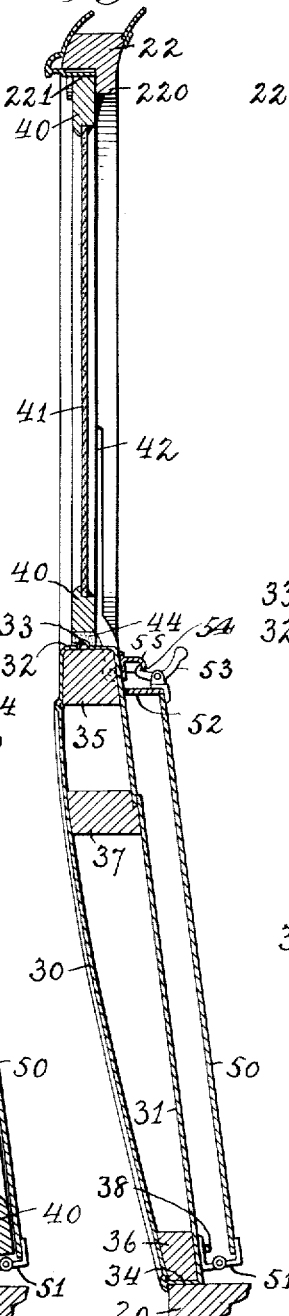
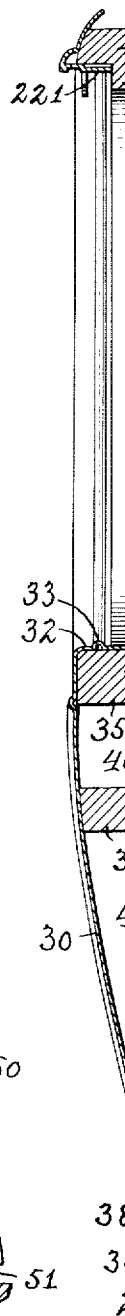
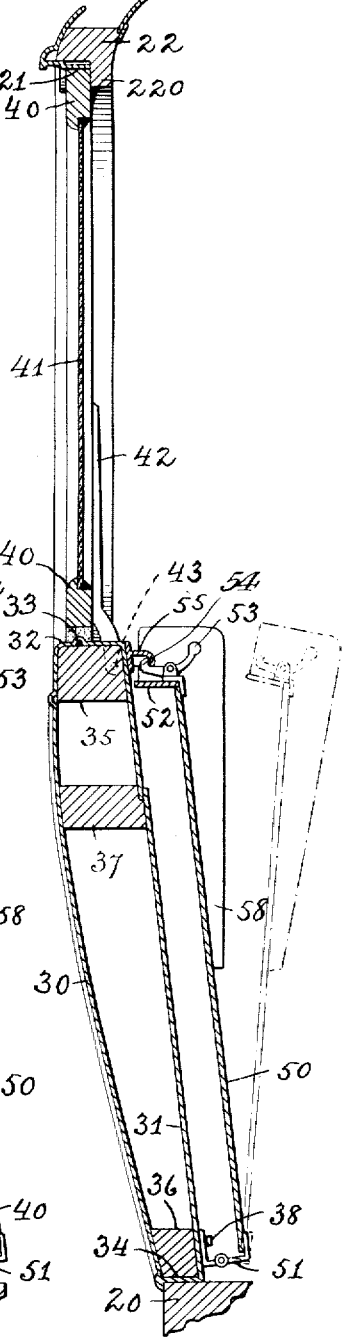
Inventor: Hinsdale Smith
by William R Baird
his Atty.

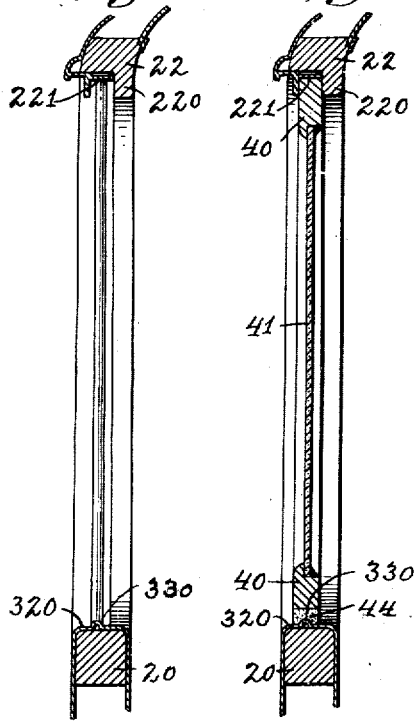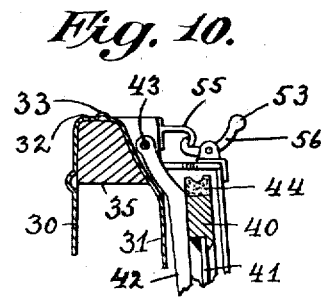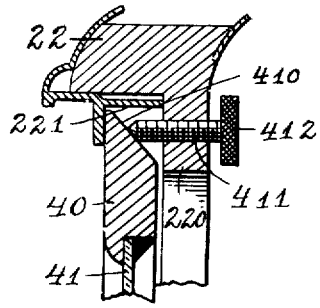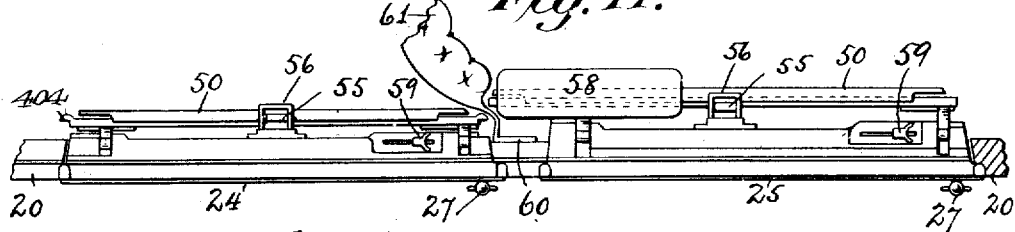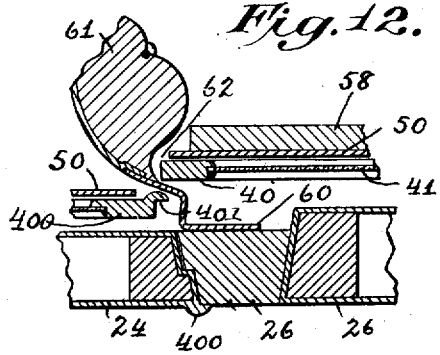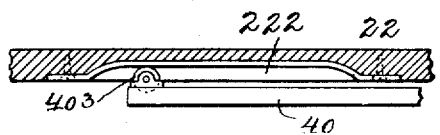

UNITED STATES PATENT OFFICE.

HINSDALE SMITH, OF SOUTH HADLEY, MASSACHUSETTS, ASSIGNOR TO THE SPRINGFIELD BODY CORPORATION OF NEW YORK, A CORPORATION OF NEW YORK.

CONVERTIBLE AUTOMOBILE-BODY.

1,251,433. Specification of Letters Patent. Patented Dec. 25, 1917.

Application filed February 2, 1916. Serial No. 75,636.

*To all whom it may concern:*

Be it known that I, HINSDALE SMITH, a citizen of the United States, residing at South Hadley, in the county of Hampshire and State of Massachusetts, have invented certain new and useful Improvements in Convertible Automobile-Bodies, of which the following is a specification.

This invention relates to automobile bodies and particularly to those which can be readily and quickly converted from an open to a closed car, and vice versa.

The object of the invention is to provide an automobile which has a body and a top which extends completely over the body and which, when in position, leaves an unobstructed space between the body and the top, with windows adapted when the car is used as a touring car, to be put away out of sight, and when it is used as limousine to be placed in position to inclose the space between the body and the top.

There are other objects of the invention which will be hereinafter pointed out in detail.

In the drawings, Figure 1 is a side elevation of an automobile embodying the invention, showing an unobstructed space between the body and the top; Fig. 2 is a similar view, showing the space inclosed; Figs. 3, 4, 5, 6, 7, 8 and 9 are sections on the planes of the lines respectively designated by their several numerals in Figs. 1 and 2; Figs. 4 and 6 show the doors with their windows down; and Figs. 5 and 7 with their windows up; Figs. 8 and 9 show the rear windows out and in; Fig. 10 is a sectional detail of the window guard latch and catch; Fig. 11 is a top plan view of the edge of the body above the two right hand doors when the windows are down; Figs. 12, 13 and 14 are sectional details.

In the drawings, 20 is the body of an automobile having upwardly extending rear side members 21 between which is arranged the back of the vehicle (not shown) and which gradually merge into a permanent rigid top 22 between which and the body at the front of the vehicle are arranged posts adapted to inclose the usual wind shield. A foldable or collapsible top may be used instead of the permanent rigid top illustrated. On each side of the body there are hinged the usual tonneau doors 24 and fore doors 25 with a narrow vertical strip 26 between them, and these doors on their outer surfaces conform to the general contour of the body. Each door has an external handle 27. The tonneau doors and fore doors are substantially alike in construction.

Each door in the form illustrated comprises an outer wall 30, an inner wall 31, a top 32 provided with a longitudinal rib 33, and a bottom 34. These parts are preferably made of metal and reinforced by wooden slats or strips indicated at 35, 36 and 37, in any usual manner. The inner wall and some or all of the reinforcing strips may be omitted if desired. The doors themselves form no part of the invention and may in fact be made of any usual shape and material.

Each door has secured to it a window, comprising a frame 40 and a glass 41, the frames being connected to the doors by offset members 42 adapted to swing upon hinges 43 (and which hinges usually comprise a spring) arranged near the inner side of the doors so that when the window is swung downwardly as shown in Figs. 4 and 6, it will be substantially parallel with the door and will rest against a stop 38, and when it is swung upwardly as shown in Figs. 5 and 7, it will be at a slight angle to the general plane of the door. Each window is provided with a packing 44 adapted to engage the rib 33. When the window is swung upwardly, its upper inner edge will contact with a flange 220 formed in the top 22 and its upper edge will contact with a strip 221 which may be made of resilient or compressible material. When the doors and windows are closed, the rib 33 and packing 44 and frame 40 and strip 221 form snug bearing surfaces.

The window of each door is provided with means for preventing it from being injured when it is closed down against the door and which means comprise a guard 50, secured at its bottom to a hinged bracket 51, mounted at the lower edge of the door. At its top, the guard is provided with an inturned flange 52. The guard is held in its upright position by a pivoted latch 53 having a hook 54 adapted to engage a catch 55 projecting from the door. The outer member 56 of the latch is annular and serves as an internal door handle. The latch is released from the catch by tipping it on its pivot and is held in engagement with the catch either by gravity or by a spring (not shown). The guard for one of the fore doors has mounted upon it an arm rest indicated at 58. Each door is provided with the usual lever indicated at 59, by which its lock may be disengaged without turning the handle 27.

It will be noticed that the window hinged to the fore door is wider than the door itself, so that when it is swung upwardly, its rear upwardly extending frame member designated 400 is in a position back of a plane passing through the rear edge of the door 25, and this member 400 with respect to the window of the tonneau door 24 performs the function of an upright post, a flange 401 on the window of the tonneau door serving to overlap and contact with the member 400 of the fore door. This construction brings the line of contact between the frames of the two windows to the rear of the body strip 26 and completes the closure and promotes the rigidity of the closed vehicle. The tonneau window at its rear edge has a flange 404 which serves to overlap the rear window in a similar manner.

It should also be noted that the hinges by which the window is secured to the fore door are wider than those by which the window is secured to the tonneau door and that the pintles of the fore door hinges are in a line back of a vertical plane passing through the pintles of the tonneau door. This construction leaves a space between the windows of the two doors and permits the passage of a bracket 60 which is secured to the body strip 26 and is adapted to support a chauffeur's seat hereinafter referred to.

It is obvious that when the window of the fore door is in the upright position shown in Figs. 7, and if its hinges are in vertical line as shown in the form illustrated, and an attempt is made to close such door, on account of the window frame extending back of the rear edge of the door, the upper inner edge of such frame will contact with the part 220 of the top 22 before the inner edge of the door itself will contact with an adjacent surface of the strip 26. In order to prevent injury to the door under such circumstances, a roller 403 is secured to the upper rear edge of the fore door sash 40, and the top of the vehicle may be recessed as indicated at 222.

The upper top edge of the body 20 back of the tonneau door is provided with an upstanding rib 330 similar to the rib 33 on the upper edges of the doors. The rear windows comprise sash members 40 and glass panes 41, and the lower edge of each sash is provided with a packing or gasket 44 like the sash sections of the doors. When it is desired to insert these rear windows in place, the lower sash frame is brought in line with the rib 330 and the upper inner edge of the sash is brought to contact with the flange 220 of the top 22 and its uppermost edge with the member 221 of said top. Ordinarily this forms a tight enough fit, but in order that all rattling or vibration of the rear window shall be prevented, the upper edge of the sash frame 40 is beveled as indicated at 410 (see Fig. 14) and a set screw 411 provided with a milled head 412 and passing through a threaded aperture in the flange 220 is adapted to bear against such beveled edge to hold the window in position.

The bracket 60 secured to the inner side of the body strip 26 passes between the two doors and their windows and is adapted to support a seat 61 for the chauffeur and which seat is recessed as indicated at 62 to allow the rearward extension of the fore door window to be swung back into the position indicated in Fig. 12.

When the parts are in the position shown in Fig. 1, and it is desired to convert the car into a limousine, the rear windows are first placed in position by sliding them into engagement with the flange 220 of the top and the rib 330 on the edge of the body. The fore doors are then swung open, and the guards thereon swung outwardly so as to permit the windows to be moved to an upright position and the fore doors are then closed. The contact of the upper inner edge of the window with the flange 220 of the top and the compressibility of the lower member of the frame 40 through the packing 44 against the rib 33 resembles the straightening of a toggle joint and forms a slightly yielding engagement of the window, both with the door and with the top. The tonneau doors are then swung open, their guards released and swung forward, and their windows raised until they are in the position shown in Fig. 5, and the doors then being swung on their hinges, the windows and doors are closed, the vertical overlapping flanges on the windows contacting with the rear vertical frame member of the fore door and the front vertical frame member of the rear window forming a complete closure. If necessary, the rear windows are then held to position by means of the set screw 411.

It is obvious that the carriage may be converted to an open vehicle by reversing these operations although their order is not important.

I claim:

1. An automobile comprising a body, a back, a permanent top and supporting posts between the body and the front of the top, in combination with tonneau doors and fore doors on each side, each door having a hinged window section adapted to be swung into position between the door and the top and means for holding it there, including overlapping members on the contacting edges of the windows.

2. An automobile comprising a body, a back and a top, in combination with tonneau doors and fore doors on each side, separated by a portion of the body, each door having a hinged window section adapted to be swung into position between the body and the top and one of the window sections being substantially equal in width to the width of the door to which it is hinged plus the width of the body portion between it and the other door.

3. The combination of a vehicle door, a window hinged thereto and a guard for the window comprising a plate hinged to the door, the guard overlapping the window, means for temporarily holding the guard in place, and an arm rest secured to the guard.

4. The combination with an automobile body and a top therefor, of posts one on each side of the body and top and adapted to support the top from the body, a door hinged to the body, the front vertical edge of which is substantially in line with one of the posts, a window hinged to the door and adapted to be moved to a position alongside of the door and to another position above the door to close the space back of the post in front of its sash, the window being so formed that it extends beyond one edge of the door.

5. In a vehicle having a body and top, a door hinged to the body and a window sash hinged to the inner edge of the door and adapted to be brought to a position above the door to fit between it and the vehicle top, the window sash being wider than the door.

6. In a vehicle having a body and top, a door hinged to the body and a window sash hinged to the inner edge of the door and adapted to be brought to a position above the door to fit between it and the vehicle top, the window sash being wider than the door, in combination with means for preventing the rear upper edge of the window from jamming against the top.

7. In a vehicle having a body and top, a door hinged to the body and a window sash hinged to the upper inner edge of the door and adapted to be brought to a position above the door to fit between it and the vehicle top, the window sash being wider than the door, in combination with means for preventing the rear upper edge of the window from jamming against the top, including a rolling member interposed between the window sash and the top.

8. In a vehicle having a body and top, a door hingedly secured to the body and a window sash hinged to the upper inner edge of the door and adapted to be swung to a position above the door to fit between it and the vehicle top, the window sash being so formed that it extends rearwardly beyond the line of the door hinge.

9. In a vehicle having a body and top, a door hingedly secured to the body and a window sash hinged to the door, and adapted to be swung to a position between the door and the top, the sash being wider than the door and extending rearwardly beyond the line of the door hinge, in combination with means for lessening the friction of contact between the window sash and the top.

10. In a combination, a vehicle, a permanent top therefor, a door hinged to the vehicle below the top, a window hinged to the door and adapted to be raised between the vehicle and the top, and of such a width that it extends rearwardly of the line of the door hinge, with a rolling member interposed between the window and the top to lessen the friction of contact between them.

11. The combination with a vehicle having a body, a rigid top, a window adapted to be slidably placed in position between the two, of means for holding it firmly against rattling including a yielding member secured to one edge of the window, said window having a bevel edge, and a set screw threaded through the top and adapted to engage said bevel edge to exert a downward and lateral pressure against the opposite edge of the window thereby holding the yielding member under tension and holding the window against lateral movement.

12. The combination of an automobile body and a top therefor, with two doors arranged on the same side of the body one back of the other, leaving a vertical strip of the body between them, each door provided with a window secured thereto, and adapted to be moved to a position between the body and the top and one of the windows being wider than the door to which it is secured, and having one of its vertical edges above and extending beyond the plane of the body strip between the two doors.

13. The combination with an automobile body having a top, of two doors arranged on the same side of the body in longitudinal succession leaving a substantial strip between them, each door having a window secured thereto adapted to be raised into a position between the door and the top when the doors are closed, one of said windows being wider than the door to which it is secured whereby it extends into the space above the strip between the two doors and contacts with the edge of the sash on the adjacent door.

14. The combination with an automobile body and a top therefor of two doors arranged on one side of the body leaving a substantially vertical strip between them, each door having a window secured thereto and adapted to be moved to position between the body and the top and one window being wider than the other so that it extends over the space between the two doors and contacts with the edge of the adjacent window in an overlapping relation.

15. In combination, an automobile body having a tonneau door and a fore door and a top, and a space along the body between the door apertures, a window secured to each door and adapted to be raised to position between the body and the top, the window on the fore door being wider than that on the tonneau door, and so arranged that it extends back of the fore door over that portion of the body between the door apertures to contact with the front edge of the window on the tonneau door when both windows are raised.

16. In combination, an automobile body, a top therefor, two doors arranged on the same side of the body leaving a vertical strip between them, each door having a window hinged to it, one of said windows being wider than the door to which it is attached and to overlap the edge of the window on the adjacent door, said windows arranged to be lowered alongside of its door, or raised to a position between the door and the top, the hinges being wider between one door and its window than between the other door and its window, said windows being horizontally alined when in raised position and out of horizontal alinement when lowered.

17. In combination, an automobile body, a top therefor, two doors arranged on the same side of the body leaving a vertical strip between them, each door having a window hinged to it, to be lowered alongside of its door, or raised to a position between the door and the top, one of the windows being wider than its door and the hinges between such window and its door being wider than the hinges between the other window and its door, said windows being horizontally alined when in raised position and out of horizontal alinement when lowered.

18. In combination, an automobile body, a top therefor, two doors arranged on the same side of the body leaving a vertical strip between them, the outer surfaces of the doors and strips being practically continuous when the doors are closed, each door having a window secured to it by hinges having substantially horizontal pintles, one of said windows being wider than the door to which it is attached and to overlap the edge of the window on the adjacent door, the pintles of one door being arranged in a plane back of the pintles of the other door, said windows alining horizontally with each other when in raised position and out of alinement with each other when lowered.

19. In combination, an automobile body, a top therefor, two doors arranged on the same side of the body leaving a vertical strip between them, the outer surfaces of the doors and strips being practically continuous when the doors are closed, each door having a window secured to it by hinges having substantially horizontal pintles, the pintles of one door being arranged in a plane back of the pintles of the other door, the window of the door with the pintles farthest from the surface of the automobile body extending rearwardly of the line of the hinges on which the door is hung to the body of the automobile, said windows alining horizontally with each other when in raised position and out of horizontal alinement with each other when lowered.

20. In combination, an automobile body, a top therefor, two doors arranged on the same side of the body leaving a vertical strip between them, each door having a window hinged to it, to be lowered alongside of its door, or raised to a position between the door and the top, the hinges being wider between one door and its window than between the other door and its window, and a seat bracket secured to the strip between the doors.

In testimony whereof I affix my signature.

HINSDALE SMITH.

Copies of this patent may be obtained for five cents each, by addressing the "Commissioner of Patents, Washington, D. C."